US012696856B2

(12) United States Patent
Munson

(10) Patent No.: US 12,696,856 B2
(45) Date of Patent: Aug. 4, 2026

(54) AUTOMATIC ROTATING AGRICULTURAL SYSTEM TO IRRIGATE, PLANT, GATHER FORAGE, AND/OR HARVEST FIELD

(71) Applicant: FOI Group LLC, Dallas, TX (US)

(72) Inventor: David Munson, Dallas, TX (US)

(73) Assignee: FOI GROUP LLC, Dallas, TX (US)

( * ) Notice: Subject to any disclaimer, the term of this patent is extended or adjusted under 35 U.S.C. 154(b) by 387 days.

(21) Appl. No.: 18/218,346

(22) Filed: Jul. 5, 2023

(65) Prior Publication Data

US 2023/0345877 A1     Nov. 2, 2023

Related U.S. Application Data

(63) Continuation-in-part of application No. 17/075,349, filed on Oct. 20, 2020, now Pat. No. 11,716,935.

(Continued)

(51) Int. Cl.
*A01G 25/09*          (2006.01)
*A01G 25/16*          (2006.01)
(Continued)

(52) U.S. Cl.
CPC ......... *A01G 25/092* (2013.01); *A01G 25/095* (2013.01); *A01G 25/162* (2013.01);
(Continued)

(58) Field of Classification Search
CPC .. A01G 25/092; A01G 25/095; A01G 25/162; A01B 79/005; A01D 43/077; A01D 43/086; A01D 43/14
See application file for complete search history.

(56) References Cited

U.S. PATENT DOCUMENTS 2,892,593 A * 6/1959 Smeltzer .............. A01G 25/092
                                                    91/173
3,186,493 A * 6/1965 Barry .................... A01B 79/00
                                                    172/26

(Continued)

FOREIGN PATENT DOCUMENTS

CN          104429654 A     3/2015
CN          104584738 A     5/2015
(Continued)

OTHER PUBLICATIONS

Non-Final Rejection dated Dec. 9, 2022, from U.S. Appl. No. 17/075,349, 37 sheets.
(Continued)

*Primary Examiner* — Arpad Fabian-Kovacs
(74) *Attorney, Agent, or Firm* — MICHAEL BEST & FRIEDRICH LLP

(57)                    ABSTRACT

An agricultural system including a center pivot frame fixed on ground and frame segments connected to each other and rotatably connected to the center pivot frame and are configured to pivot or rotate about the center pivot frame. Each frame segment includes a section frame having wheels, a cutter trolley beam that is coupled to the section frame, a cutterhead coupled to the cutter trolley beam to cut forage or crop, and a radial conveyor supported by the section frame. The agricultural system also includes a feed storage bin connected to the frame segments and comprising wheels to enable a movement of the feed storage bin about the center pivot frame together with the frame segments, wherein the feed storage bin is configured to receive the cut forage or crop transported by the radial conveyors.

27 Claims, 11 Drawing Sheets

Related U.S. Application Data

(60) Provisional application No. 62/923,760, filed on Oct. 21, 2019.

(51) Int. Cl.

| | |
|---|---|
| *A01B 79/00* | (2006.01) |
| *A01D 43/077* | (2006.01) |
| *A01D 43/08* | (2006.01) |
| *A01D 43/14* | (2006.01) |

(52) U.S. Cl.

CPC .......... *A01B 79/005* (2013.01); *A01D 43/077* (2013.01); *A01D 43/086* (2013.01); *A01D 43/14* (2013.01)

(56) References Cited

U.S. PATENT DOCUMENTS

| | | | | |
|---|---|---|---|---|
| 3,314,608 | A | | 4/1967 | Curtis et al. |
| 3,379,378 | A | * | 4/1968 | Kern ....................... A01G 25/09 239/733 |
| 3,587,763 | A | * | 6/1971 | Kinkead ................. A01G 25/09 239/733 |
| 3,608,825 | A | * | 9/1971 | Reinke ................. A01G 25/097 137/44 |
| 3,623,663 | A | * | 11/1971 | Koinzan .............. A01G 25/092 239/731 |
| 3,628,729 | A | * | 12/1971 | Thomas ............... A01G 25/092 239/731 |
| 3,851,659 | A | * | 12/1974 | Zimmerer ............ A01G 25/092 239/730 |
| 4,059,911 | A | | 11/1977 | Bean et al. |
| 4,209,068 | A | | 6/1980 | Corsentino |
| 5,255,857 | A | * | 10/1993 | Hunt .................... A01G 25/092 239/731 |
| 5,678,771 | A | * | 10/1997 | Chapman ............. A01G 25/092 239/727 |
| 5,685,497 | A | | 11/1997 | Cole |
| 6,007,004 | A | * | 12/1999 | Unruh ................. A01G 25/092 239/731 |
| 6,039,273 | A | | 3/2000 | Christensen |
| 6,337,971 | B1 | * | 1/2002 | Abts ..................... H04L 51/222 331/65 |
| 6,755,362 | B2 | | 6/2004 | Krieger et al. |
| 12,389,844 | B1 | * | 8/2025 | Abts ..................... B05B 12/124 |
| 2006/0027677 | A1 | * | 2/2006 | Abts ..................... A01G 25/092 239/69 |
| 2007/0188605 | A1 | * | 8/2007 | Anderson .............. H04N 7/185 348/E7.088 |
| 2008/0046130 | A1 | * | 2/2008 | Faivre .................. A01G 25/092 239/728 |
| 2011/0017850 | A1 | * | 1/2011 | Waybright ........... A01G 25/092 239/728 |
| 2012/0305682 | A1 | | 12/2012 | Korus |
| 2013/0041537 | A1 | * | 2/2013 | Malsam ............... A01G 25/095 701/50 |
| 2013/0226356 | A1 | * | 8/2013 | Pfrenger .............. A01G 25/092 700/284 |
| 2014/0183288 | A1 | | 7/2014 | Bullard, III |
| 2015/0102136 | A1 | | 4/2015 | Malsam |
| 2016/0157445 | A1 | | 6/2016 | Mortensen |
| 2017/0359974 | A1 | * | 12/2017 | Whalley .............. A01G 25/162 |
| 2018/0007847 | A1 | * | 1/2018 | Raj ....................... G05D 1/0094 |
| 2022/0015310 | A1 | * | 1/2022 | Raj ........................ G05D 1/689 |
| 2022/0144433 | A1 | * | 5/2022 | Miller ................... A01G 25/16 |

FOREIGN PATENT DOCUMENTS

| | | | | | |
|---|---|---|---|---|---|
| CN | 111480451 | A | | 8/2020 | |
| CN | 116998388 | A | * | 11/2023 | ........... A01G 25/092 |
| WO | WO-2013023025 | A1 | * | 2/2013 | ........... A01G 25/162 |
| WO | 2017106874 | A1 | | 6/2017 | |
| WO | 2019/126126 | A1 | | 6/2019 | |

OTHER PUBLICATIONS

Notice of Allowanced dated Mar. 15, 2023, from U.S. Appl. No. 17/075,349, 15 sheets.

International Search Report and Written Opinion dated Feb. 1, 2021, from International Patent Application No. PCT/US2020/056502, 15 sheets.

International Preliminary Report on Patentability dated May 5, 2022, from International Patent Application No. PCT/US2020/056502, 9 sheets.

\* cited by examiner

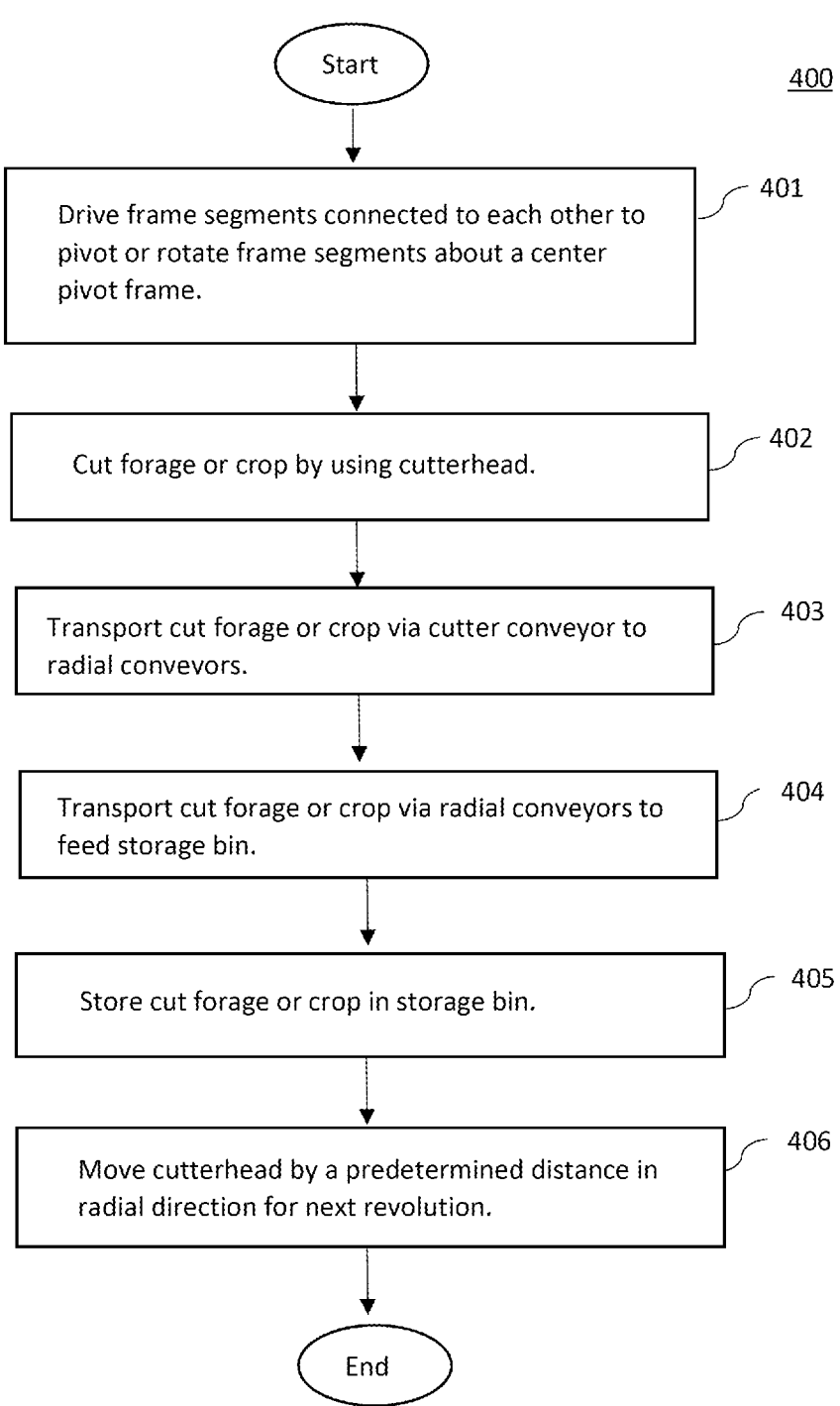
_FIG. 4_

AUTOMATIC ROTATING AGRICULTURAL SYSTEM TO IRRIGATE, PLANT, GATHER FORAGE, AND/OR HARVEST FIELD

CROSS REFERENCE TO RELATED APPLICATIONS

This application is a continuation-in-part (CIP) application of U.S. patent application Ser. No. 17/075,349, filed on Oct. 20, 2020, which claims the priority of U.S. Provisional Application Ser. No. 62/923,760, filed on Oct. 21, 2019, which is hereby incorporated herein by reference in its entirety.

BACKGROUND

Most farming operations use wheeled equipment driving over the field to plant or harvest a crop. In the best case scenario, only soil compaction occurs. In the worst case scenario, significant rutting occurs with lasting damage to the field. Wheeled equipment usually requires an operator and, because it must be able to do its job in a short time, is large and expensive. In the case of fodder for animals, the crop is either harvested by machine or grazed. In both cases there is significant compaction of the ground and in the case of grazing extensive damage to soil and fodder by both animal hooves and manure. In intensive grazing a substantial amount of ground can be rendered ungrazeable by manure and urine contamination. Current forage harvesting systems are wheeled and usually cut the forage plant off at a low near ground height. Wheeled equipment is restricted to dry conditions to avoid soil damage and rutting. Current methods waste a lot of potential and hurt plant growth with compaction, trampling, manure damage, low cutting height and other ills. What is needed is a system that overcomes these disadvantages, is automated and multi-purpose.

SUMMARY

The automatic rotating agricultural system of the disclosed invention offers all-weather, twenty-four hours seven days a week (24-7) feed harvesting and watering with substantial advantages. The rotating agricultural system with widely spaced permanent wheel circular paths leaves the vast majority of the field untouched for optimal growing conditions. This agricultural system offers new capability and higher productivity.

These advantages and others are achieved, for example, by an automatic, rotating agricultural system to irrigate, plant, gather forage, and/or harvest a field. The agricultural system includes a center pivot frame fixed on ground, a plurality of frame segments connected to each other, and a feed storage bin coupled to the center pivot frame and the frame segments. The frame segments are connected to the center pivot frame and are configured to pivot or rotate about the center pivot frame. Each frame segment includes a section frame including wheels to enable a movement of the section frame, a cutter trolley beam that is coupled to the section frame and extends in a radial direction of the section frame, at least one cutterhead coupled to the cutter trolley beam to cut forage or crop, a radial conveyor supported by the section frame, and a cutter conveyor operatively coupled to the cutterhead. The cutterhead is movable along the cutter trolley beam in the radial direction of the section frame, and each rotation of the at least one cutterhead moving to a different arc diameter to cover the entire field over a period of multiple rotations. The radial conveyor moves the cut forage or crop in the radial direction of the section frame. The cutter conveyor moves the cut forage or crop from the cutterhead to the radial conveyor.

The agricultural system may include a segment transfer conveyor operatively coupled between the radial conveyors of the frame segments to transfer the cut forage or crop between the frame segments, and a storage bin transfer conveyor operatively coupled between the feed storage bin and the radial conveyor of the nearest frame segment to transfer the cut forage or crop to the feed storage bin. Each frame segment may include at least one cutter trolley movably coupled to the cutter trolley beams and supporting the cutterhead and the cutter conveyor. The cutter trolley moves the cutterhead and the cutter conveyor in the radial direction of the section frame along the cutter trolley beam. The cutterhead may be supported by the cutter trolley in a manner that a height of the cutterhead from the ground is adjusted by the cutter trolley. The feed storage bin may include a floor conveyor formed on a floor of the feed storage bin to move the stored cut forage or crop. The frame segments may include irrigation supply pipes to supply water to sprinklers or nozzles connected to the irrigation supply pipes. The center pivot frame may include a center pivot supply pipe that supplies water to the irrigation supply pipes of the frame segments. At least one of the frame segments may have a driving wheel to drive the frame segments connected to each other to pivot or rotate about the center pivot frame.

The agricultural system may include at least one power source to supply power to motors of the frame segments which drive at least one driving wheel, the radial conveyors and the cutter conveyors of the frame segments. The at least one power source may include one or more rechargeable batteries. The agricultural system may include a control unit to control operations which include starting driving of the frame segments connected to each other to pivot or rotate about the center pivot frame, stopping the driving of the frame segments connected to each other, and adjusting a position of the at least one cutterhead along the cutter trolley beam. The agricultural system may include comprising a solar panel unit that includes a plurality of solar panels that produce electrical energy. The electrical energy may be supplied to motors of the frame segments to drive at least one driving wheel, the radial conveyors and cutter conveyors of the frame segments. The solar panels may be placed on the section frames of the frame segments in a manner that the solar panels do not shade the cut forage or crop on the radial conveyors from sunlight.

The cutterhead may include a gathering head that gathers forage or crop, a cutting knife that cuts the gathered forage or crop, and a chopper that chops the cut forage or crop, wherein the chopped forage or crop is transferred to the cutter conveyor. The wheels may be placed at end sides of the section frame with no wheel between the end sides of the section frame.

These advantages and others are achieved, for example, by an automatic, rotating agricultural system to irrigate, plant, gather forage, and/or harvest a field. The agricultural system a center pivot frame fixed on ground, a plurality of frame segments connected to each other, and a feed storage bin coupled to the center pivot frame and the frame segments. The frame segments are connected to the center pivot frame and are configured to pivot or rotate about the center pivot frame. Each frame segment includes a section frame including wheels to enable a movement of the section frame, a cutter trolley beam that is coupled to the section frame and extends in a radial direction of the section frame, at least one attachment coupled to the cutter trolley beam to gather forage or crop, a radial conveyor supported by the section frame, and a cutter conveyor operatively coupled to the least one attachment. The attachment may include a gathering head that gathers forage or crop, a cutting knife that cuts the gathered forage or crop, and/or a chopper that chops the cut forage or crop. The chopped forage or crop is transferred to the cutter conveyor.

These advantages and others are achieved, for example, by a method for operating an automatic, rotating agricultural system to irrigate, plant, gather forage, and/or harvest a field. The method includes driving frame segments connected to each other to pivot or rotate the frame segments about a center pivot frame fixed on ground, cutting forage or crop by using at least one cutterhead of the frame segments, transporting the cut forage or crop via a cutter conveyor to the radial conveyors of the frame segments from the at least one cutterhead, transporting the cut forage or crop via the radial conveyors to a feed storage bin, storing the cut forage or crop in the feed storage bin, and moving the cutterhead by a predetermined distance in the radial direction of the frame segments to adjust a position of the cutterhead for a next revolution.

BRIEF DESCRIPTION OF THE DRAWINGS

The preferred embodiments described herein and illustrated by the drawings hereinafter be to illustrate and not to limit the invention, where like designations denote like elements.

FIG. 4 is a flowchart diagram of a method for operating an automatic, rotating agricultural system to irrigate, plant and/or harvest a field.

DETAILED DESCRIPTION

Figure 1A:
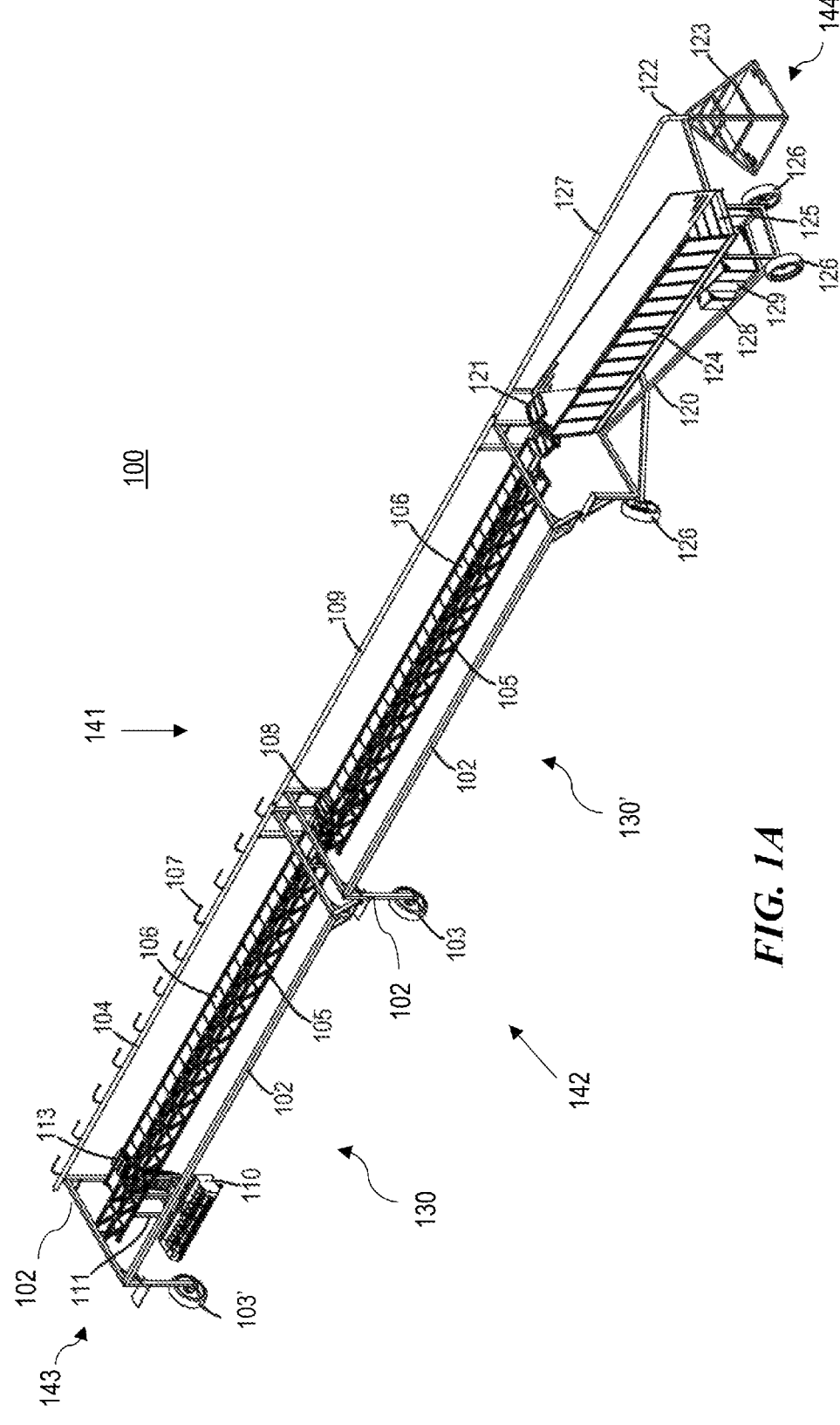
FIGS. 1A-1E are a perspective view, top view, side view, front view, and rear view of an exemplary embodiment of an automatic, rotating agricultural system that rotates around a central pivot point in either a full rotation or a partial arc to irrigate, plant and/or harvest a field.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Described herein are embodiments of an automatic, rotating agricultural system. Embodiments of the rotating agricultural system can plant a crop, water a crop, gather forage, and/or harvest a crop either at the same time or in separate operations. Embodiments may utilize the rotational direction of a traditional pivot irrigation system, while incorporating a radial conveyor to the structure that can receive crop material at any point along its radial extent and deliver the crop material to the central pivot area for processing or transport to a use point. A series of harvesting units can be suspended from the designed frame and designed so that they can be moved to cut a different arc with each rotation so that the entire field is cut after enough rotations so that all radiuses have been cut. In the case of continuously growing crops like forage, watering and harvesting can be done simultaneously for maximum productivity. For example, in the case of a grass crop, combined cutterheads that cover about ten percent of the radial length of the mechanism could cut an entire field in ten (10) rotations regardless of whatever duration is desired for optimal production. The ability of the suspended cutters to cut the plant at any height without trampling or disturbing the remaining plant allows continuous photosynthesis and allows recovery time for the crop. There is no soil compaction except at the distantly spaced wheeled support towers that travel in set arcs.

The rotating agricultural system offers all-weather, twenty-four hours seven days a week (24-7) feed harvesting and watering with substantial advantages. The rotating system with widely spaced permanent wheel circular paths leaves the vast majority of the field untouched for optimal growing conditions. Keeping the cattle on concrete in fabric shelters provides an optimal place for short term feeding before slaughter as there is no difficulty gathering the cattle when they are ready to be walked to the slaughterhouse. This agricultural system allows maximum production from a forage crop ideally one like eastern Gamma grass that is high quality but needs to be not cut or grazed short. With the overhead support frame holding up the cutterhead, the forage can be cut at any desired height for optimal growth and use. It is believed that cutting the forage at several feet of height will allow more rapid regrowth and better quality. At the end of the season after frost, the forage can be cut low so that a winter forage crop can be planted or allowed to grow.

A sickle or disc type cutterhead may be used for harvesting but the system can use a variety of harvesting heads and can also be equipped with planters etc. to do operations. There is tremendous benefit in not having wheel or animal traffic on muddy type soils that are heavily irrigated with wastewater effluent on a continuous basis. As winter production will be much lower than summer, it is desirable to store feed during peak growing times for use in winter. For optimal feed handling, the cutterhead is equipped with a feed chopper to cut the forage into short lengths for easy conveying and feeding. For storage, the feed can be ensiled or dried and baled or cubed. Waste heat from the biogas digester and or the engine generator powered by it can be used to dry the stored feed for optimal quality.

The agricultural system of the disclosed invention is intended to run full time pausing once a revolution to move the cutters to a new radius position to cut new feed until all the field is cut and the process starts over on the first arc cut. This system allows maximum productivity of the field unlike traditional grazing with trampling and manure damage of an intensively grazed field. Because of geometry, the inner portions of the circle cover very little ground and don't justify the labor to move a cutter on the short radius part of the circle so it is desirable to not cut the innermost area with the moveable cutters. It may be desirable to equip the irrigation equipment with a cutoff valve on the uncut inner radius sections of the circle so it can dry for tractor powered cutting. This portion could be planted to Bermuda grass for easier traditional having. While this system works with smaller fields, it is more efficient in larger fields as the area cut by a cutter increases dramatically as the radius grows. Harvesting forage at high levels of protein and energy provides high quality feed for grass fed beef finishing and dairy operation.

There are a lot of variations possible for this agricultural system with the version shown being conceptualized for a land application of effluent water use. No research has been done on harvesting Gamma grass at higher heights than are practical with typical wheeled farm equipment but can estimate sharply higher annual production with very minimal slowdown of growth due to the large amount of growing plant left in a high height harvest. The amount of time between cuttings can be adjusted by the length of time to make a revolution and the number of cutters.

The optimal height and length of regrowth time will vary with time of year. During times of high growth it may be desirable to cut at a higher height with a short duration for maximum growth and quality. For example, East Texas is too wet for traditional dry lot cattle feeding but feeding cattle on concrete floored fabric covered buildings is dry and more temperate for the cattle and allows the manure to be collected and digested for biogas and eventual compost. An example use of the harvesting system would be combined farming of cattle and fish as the fields would get plenty of nutrients from the fish effluent water, it is desirable not to see manure deposited on the fields by grazing cattle but recycled into a saleable product. It is believed that composted manure from the feeding area and the slaughterhouse is a good revenue stream in bagged and bulk form. Having cattle brought onto the property for a short time makes confinement feeding much more practical than pasture grazing as animal control is much better. The cold effluent water from the fish operation can be used to provide building air cooling for the cattle in the summer to enhance productivity as well using heat exchangers and fans. This can also slightly warm the winter air on cold days. The value of the produced biogas from a waste digester is high per acre and can help power the operation. Using the waste heat from a fueled generator to dry the excess forage can produce really top quality stored feed. Dried forage could be stored loose or compacted into bales or even cubes.

With reference to FIGS. 1A-1E, shown are a perspective view, top view, side view, front view, and rear view of an embodiment of automatic, rotating agricultural system 100 that rotates around a central pivot point (for example, center pivot frame 123) in either a full rotation or a partial arc to irrigate, plant, gather forage, and/or harvest a field in a more efficient and productive way. FIGS. 1B-1E show the agricultural system 100 viewed from the directions 141, 142, 143 and 144, respectively. Embodiments of the rotating agricultural system 100 use a series of spaced wheeled towers (such as section frames 102) to support a radial framework (such as cutter trolley beam 105) which serves to support a series of harvesting units (such as cutterhead 110) that discharge onto a radial conveyor 106 that transports the gathered forage or harvested crop to the center rotational point where the forage or harvested crop can be processed or transported for use or further processing. Embodiments of the rotating agricultural system can include a piped irrigation system (such as irrigation sprinkler pipe 104 and irrigation spray nozzles 107) to dispense water either while harvesting is underway or separately. Embodiments of the rotating agricultural system can be for planting and harvesting or used in a harvest-only mode such as when harvesting a grain crop. A wide variety of attachments may be used for planting and harvesting different crop using the same basic structure to transport the attachment around the field without an operator being present at all times. For some applications that require considerable tractive power such as planting, a supplemental drive wheel maybe attached to the planting attachment. It is in the case of partially harvesting forage crops for maximum quantity and quality of forage that it is desirable that the harvesting attachment be entirely supported by the overhead frame. This leaves the surviving plant undamaged and able to continue growing without the long recovery time of traditional forage harvesting.

Embodiments of the rotating agricultural system 100 include powered wheeled towers (section frames 102) supporting an overhead frame or cutter trolley beam 105 that is above typical crop heights, a power source 129, conveyors 106 that extend along the radial length of the system 100, and movable attachments (for example, cutterhead 110) that can be moved radially along the cutter trolley beam 105, for example, each rotation to a different arc diameter to cover the entire field for either planting or harvesting over a period of multiple rotations. The multiple rotations may take place over a variety of periods, including a period of multiple days. The number of attachments and the speed and number of rotations will vary depending on the crop and amount of time for the field to have an operation performed. For a forage crop, for example, it will be desirable to have the cutting period match the maturity cycle so that each different arc will be cut every time at the desired maturity for optimal quality and total forage production over a season. The cutting rate may be different depending on the time of year as forage crops grow at different speeds during the season. If the swaths are cut in the same order each time the crop will have the same growing time between cuttings even though it may take days or weeks to cut all the swaths.

Embodiments of the rotating agricultural system 100 may also be equipped with an irrigation supply pipes 109, 127 connected to irrigation sprinklers/nozzles 107 facing rear side to allow irrigation either while harvesting or separately. While embodiments of the agricultural system 100 may be used in a variety of situations and crops, embodiments of the rotating agricultural system 100 are ideal for waste water disposal where forage crops are grown to absorb the organic nutrients.

With reference again to FIGS. 1A-1E, the embodiment of the automatic, rotating agricultural system 100 pivots about center pivot frame 123 in a circular pattern. Frame segments 130, 130', each of which includes section frame 102 and cutter trolley beam 105, are connected to each other. Frame segments 130, 130' include support wheels 103, 103' that are configured to provide smooth movements of the frame segment 130, 130'. The support wheels 103, 103' may be swivel wheels or Omni wheels to provide smooth movements of the frame segments 130, 130'. The wheels 103, 103' may be arranged tangential to a direction to the center pivot frame 123. One or more wheels among the wheels 103, 103' may be driving wheels 103' to drive the frame segments 130, 130'. FIG. 1A shows the driving wheel 103' at the outmost side of the frame segment 130, but the location of the driving wheel 103' is not limited to this location. The driving wheel 103' can be placed at any locations to efficiently drive the frame segments 130, 130'. One or more frame segment 130, 130' may have driving wheels. Driving mechanisms such as motors 103a may be employed for the driving wheels. The frame segments 130, 130' are connected to the center pivot frame 123, e.g., by a feed storage bin 124, an irrigation supply pipe 127, and/or some other connections. FIG. 1A shows two frame segments 130, 130' for illustration purpose, but number of the frame segments is not limited. Any number of frame segments may be connected each other based on applications and size of the field. In the embodiment, the length of each frame segment may be around 60 feet (18 meters), but the frame segment is not limited to this length. Frame segments may have different lengths. In the embodiment, wheels 103, 103' are spaced apart to leave the vast majority of the field untouched for optimal growing conditions while the agricultural system 100 is driven. For example, as shown in FIG. 1A, wheels are placed at end sides of a frame segment 130 or 130'. No wheel may be placed between the end sides of the frame segment.

The center pivot frame 123 may be fixed on the ground, and the automatic, rotating agricultural system 100 may pivot about the center pivot frame 123. Center pivot supply pipe 122, which is connected to the irrigation supply pipe 127, may be coupled to the center pivot frame 123 and may extend into a water source that may be under the ground or in a remote place. Water may be supplied to the irrigation sprinkler or nozzles 107 through the center pivot supply pipe 122, the irrigation supply pipe 127 and the irrigation supply pipes 109 and the irrigation sprinkle pipe 104. The rotating agricultural system 100 includes an irrigation supply pipe (water pipe) 109 that runs the length of the rotating agricultural system 100 to supply the irrigation sprinkler or spray nozzles 107 with water. The sprinklers may be formed on the irrigation sprinkler pipe 104. FIGS. 1A-1E show the irrigation sprinkler pipe 104 and the irrigation spray nozzles 107 in the frame segment 130 for illustration purposes, but the irrigation sprinkler pipe 104 and the irrigation spray nozzles 107 can be formed on any frame segments.

Figures 1B, 1C:
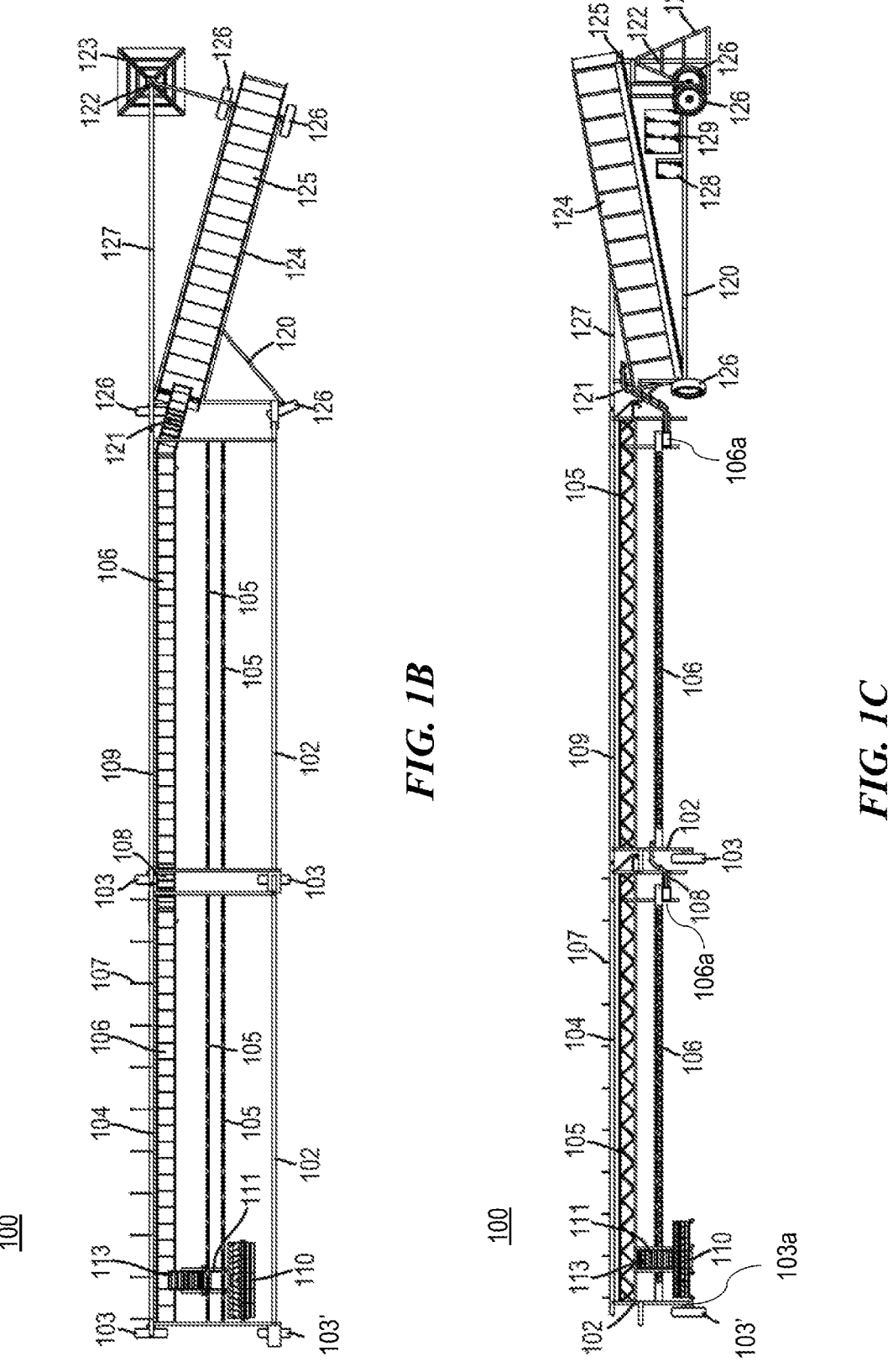
Figure 1D:
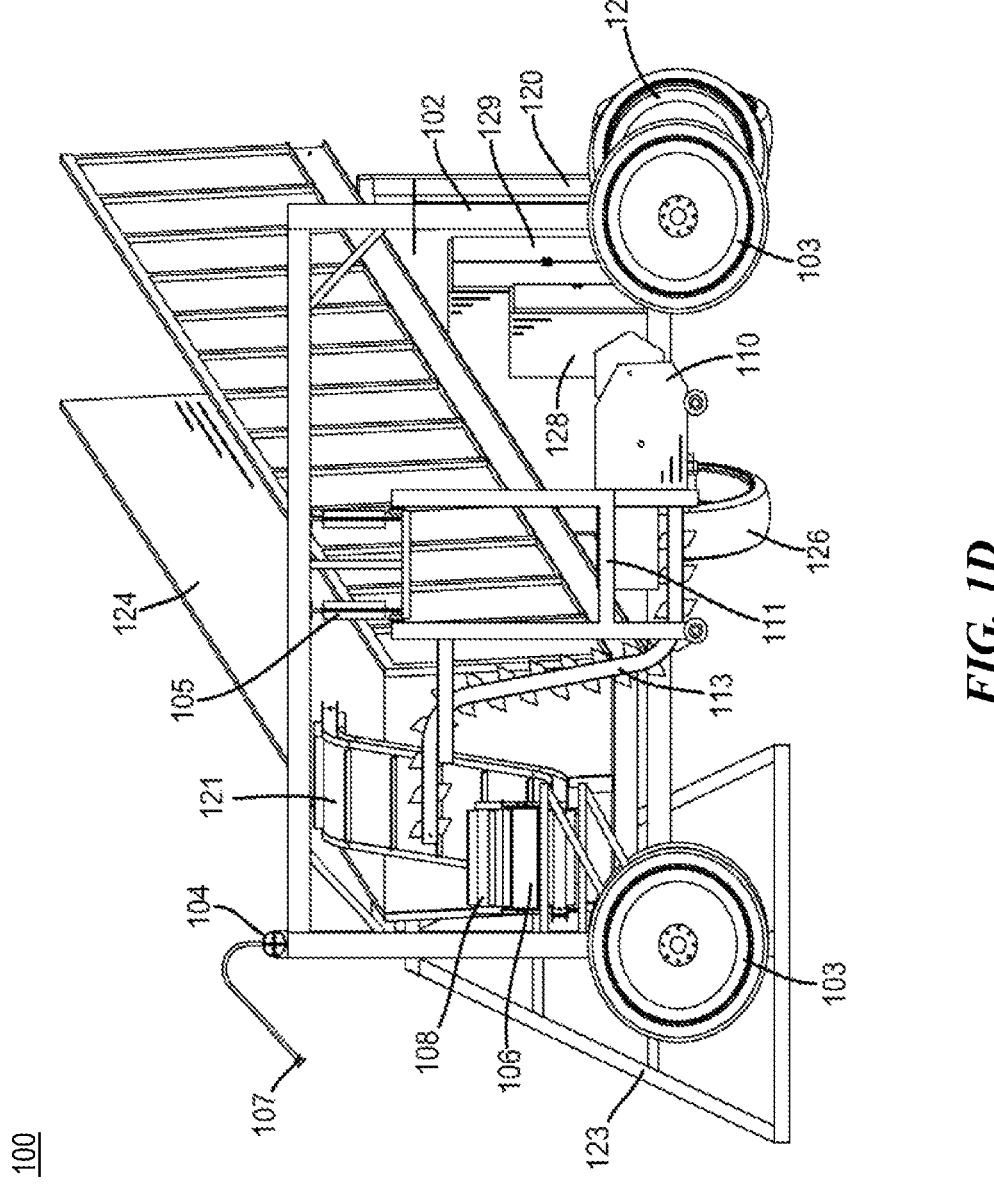
Figure 1E:
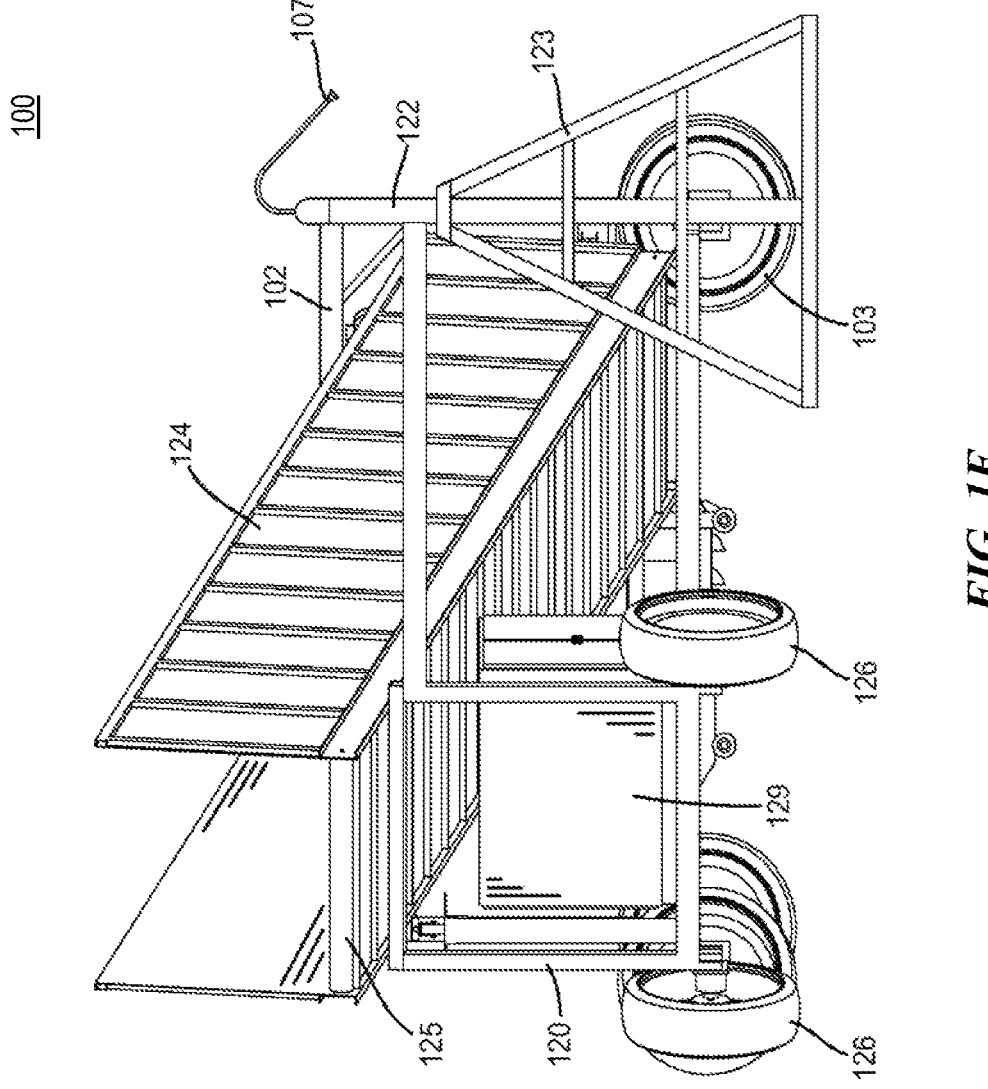

The rotating agricultural system 100 include at least one attachment to harvest crop or to cut or chop forage. The attachment may be cutterhead 110 or other equipment that may include a gathering head that gathers forage or crop, a cutting knife that cuts the gathered forage or crop, and/or a chopper that chops the cut forage or crop. For description purpose, FIGS. 1A-1E show cutterhead 110 for the attachment. The cutterhead 110 is connected to and supported by a cutter trolley beam (overhead frame) 105 that extends along the length of each frame segment 130, 130'. The cutter trolley beam 105 allows the cutterhead 110 to translate incrementally to a new arc and cut the forage at a desired height that maintains optimal growing conditions without crushing any of the crop. The cut forage (aka feed) or crop may be transported by cutter conveyor 113 upward to the radial conveyor 106 which transports the cut forage or crop to the feed storage bin 124. As shown in FIG. 1D, The cutter trolley 111 is movably coupled to the cutter trolley beam 105 and is coupled to and supports the cutterhead 110 and the cutter conveyor 113 so that the cutter trolley 111 moves the cutterhead 110 and cutter conveyor 113 along the cutter head trolley beam 105 in the radial direction of the frame segment 130. The cutterhead 110 may rotate along different arcs, each rotation to a different arc diameter to cover the entire field over a period of multiple rotations. The multiple rotations may take place over a variety of periods, including a period of multiple days. The cutter trolley 111 may be designed to adjust a height of the cutterhead 110 from the ground. The cutter trolley may adjust its height from the ground so that the distance between the cutterhead 110 and the ground may be adjusted by the cutter trolley 111. The height of the cutterhead 110 from the ground also may be adjusted by changing the coupling position of the cutterhead 110 to the cutter trolley 111 by moving the cutterhead 110 up and down. The cutter trolley beam 105 is coupled to the section frame 102 and extends in the radial direction of the frame segment 130. The cut forage or crop is transferred from one frame segment to next frame segment. In the embodiments, there may be segment transfer conveyors 108 between radial conveyors 106 of the frame segments 130, 130'. Therefore, crop can be smoothly transferred from radial conveyor 106 of one frame segment to radial conveyor 106 of next frame segment.

Cutterhead 110 may be equipped with a secondary chopper to cut forage into shorter segments for easier conveying and easier feeding at the eventual use point. Cutterhead 110 is able to radially move along the cutter trolley beam 105 by the cutter trolley 111, and travels to cut overlapping circles of feed until all the field has been cut sequentially. After a full revolution so that all the feed at a given radial distance has been cut, cutterhead 110 is moved to an adjacent position for the next revolution. Embodiments of the rotating agricultural system 100 may be designed with enough cutters so that all the feed is cut in the desired regrowth period before re-cutting forage.

With continuing reference to FIGS. 1A-1E, the frame segment 130' that is positioned nearest to the center pivot frame 123 is coupled to feed storage bin 124, and the cut forage or crop carried by the radial conveyors 106 of the frame segments may be transferred into feed storage bin 124. Storage bin transfer conveyor 121 is placed between the radial conveyor 106 of the frame segment 130' and the feed storage bin 124 so that the cut forage or crop may be smoothly transferred to the feed storage bin 124 from the frame segment 130'.

The feed storage bin 124 is mounted on and supported by storage bin frame 120. The storage bin frame 120 may be connected to the section frame 102 of the nearest frame segment 130' and may be rotatably connected to the center pivot frame 123 to support the movement of the agricultural system 100. The storage bin frame 120 has storage bin wheels 126. When the frame segments 130, 130' pivot or rotate about the center pivot frame 123, the feed storage bin 124 may move together with the frame segments 130, 130', pivoting or rotating about the center pivot frame 123. The storage bin wheels 126 may be swivel wheels or Omni wheels to provide smooth movements of the feed storage bin 124. While the rotating agricultural system 100 is operating, the cut forage or crop from the frame segments 130, 130' is transferred to and stored in the feed storage bin 124. The feed storage bin 124 may have a floor conveyor 125 positioned at the floor of the feed storage bin 124 to equally distribute the cut forage or crop inside the feed storage bin 124. After operation of the agricultural system 100 or when feed storage bin 124 is full, the cut forage or harvested crop, which is stored in the feed storage bin 124, may be transported for use or further processing. In this case, a container or feed truck (not shown) may be placed at an end of the feed storage bin 124, and the cut forage and harvested crop may be unloaded to the container or feed truck by the storage bin floor conveyor 125 for further processing.

Embodiments of the automatic, rotating agricultural system 100 include motors 103*a*, 106*a* (see FIG. 1C) that drive driving wheels 103' of the agricultural system 100 to pivot or rotate the agricultural system 100 around the center pivot frame 123, that operate and move the radially movable forage or crop cutterhead 110, and that operate the various conveyors, such as conveyors 106, 108, 125, to transport the cut forage or crop to the storage bin 124. The motors may be coupled with any driving mechanisms, and may be placed near the components of the rotating agricultural system 100 which require driving power. FIG. 1C shows motors 103*a* to drive the driving wheel 103' and motors 106*a* to drive the conveyor 106, but other moving components that require motions or movements, such as the cutter conveyor 113 and cutter trolley 111, have motors at proper locations to drive the components. The rotating agricultural system 100 includes at least one power source 129 to supply power to the motors and components that require power. The power source 129 may be rechargeable batteries, fueled generators and/or power supply that may be connected to power grids. Such embodiments may also include at least one computerized, programmable control unit 128 that manages power distribution and controls components such as motors to operate the rotating agricultural system 100 to automatically and programmably operate the agricultural system 100 as described herein.

Figure 1F:
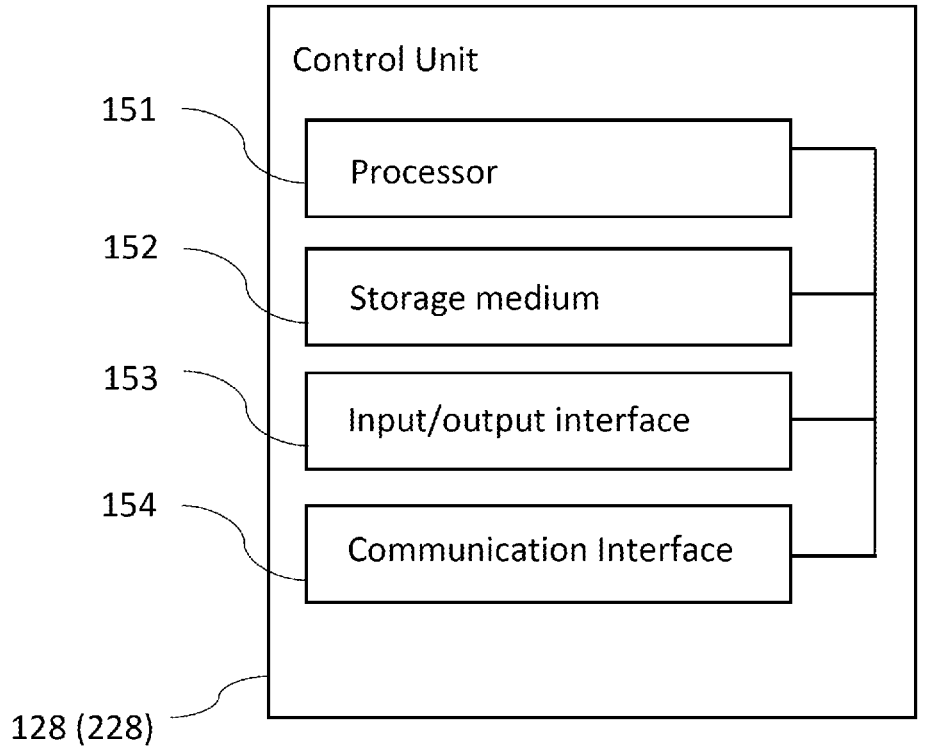
FIG. 1F is a diagram showing elements of the control unit that controls components of the automatic, rotating agricultural system.

With reference to FIG. 1F, shown is a diagram showing elements of the control unit 128. The control unit 128 may include at least one computerized system, such as a computer, that includes at least one processor 151, one or more computer readable non-transitory storage mediums 152, input/output interfaces 153, such as a display device or touch screen device, keyboard and mouse, for interactions with operators, and communication interfaces 154 such as networking adaptor for communications through Internet, WiFi and/or cellular networks. The computer readable storage mediums 152 may include programing codes including instructions to execute the at least one processor to perform various operations required for operations of the agricultural system 100. The various operations may include, but not limited to, setting starting time and stopping time for operations of the agricultural system 100, adjusting positions of one or more cutterheads 110 after a full revolution, setting rotation speed of the agricultural system 100, setting speeds of various conveyors 106, 108, 125, setting timing to supply water to the irrigation supply pipes 104, 109, 127 to operate sprinkles or spray nozzles 107, and monitoring with detectors whether the feed storage bin 124 is full.

The control unit 128 is also coupled to the power source 129, and the programing codes of the control unit 128 further include instructions to control the power source 129. For example, if the power source 129 includes one or more rechargeable batteries, the programing codes may include instructions to monitor state of the rechargeable batteries such as state of health and state of charge of the rechargeable batteries, and output voltage and current from the rechargeable batteries. For example, if the control unit 128 detects that the state of charge of the rechargeable batteries is below a predetermined level, the control unit 128 may switch the power source 129 to power supply connected to power grid while recharging the rechargeable batteries. The control unit 128 may transmit states of the operations of the agricultural system 100 including any malfunctioning to operators in remote places through the communication interfaces.

Figure 2:
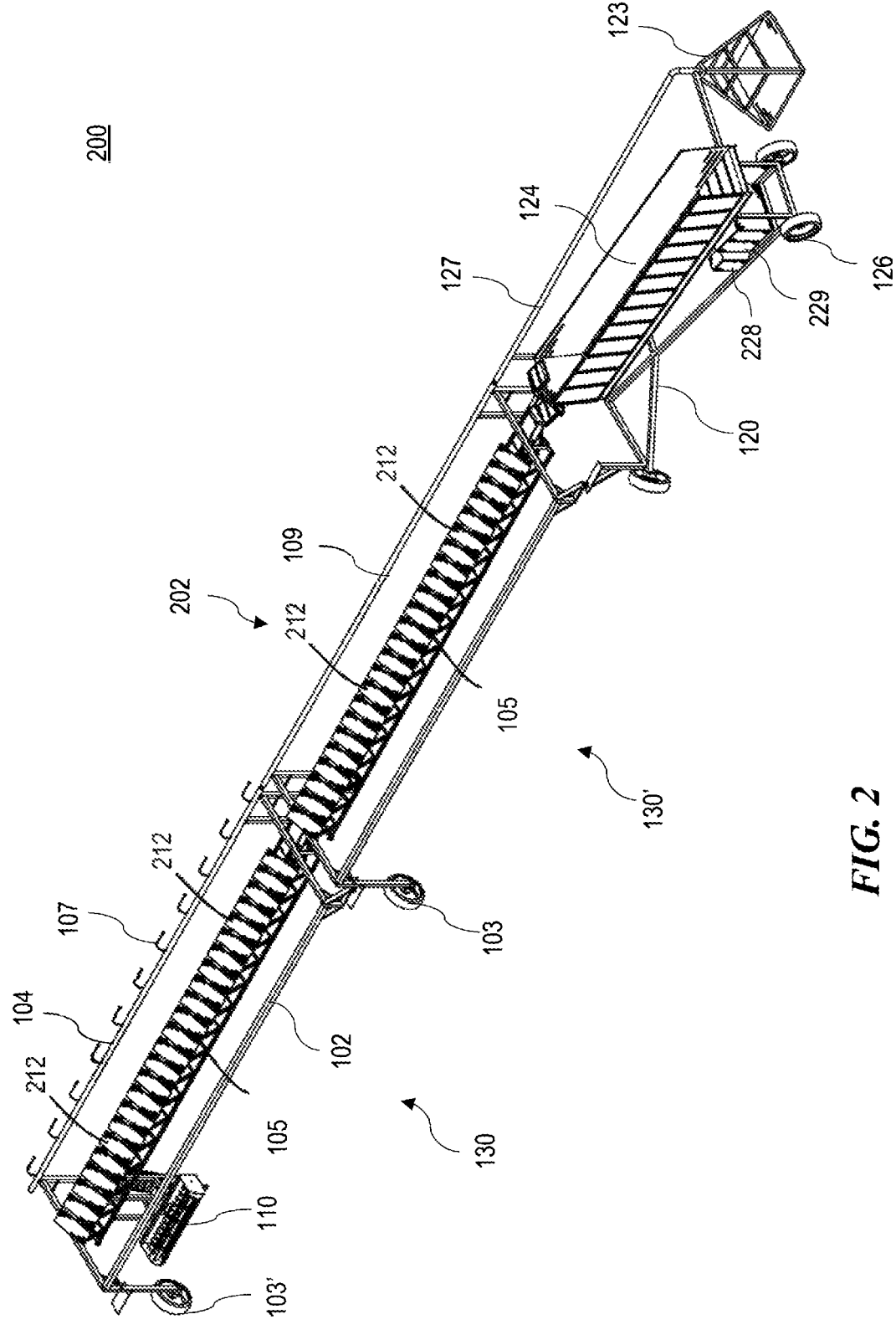
FIG. 2 is a perspective view of an exemplary embodiment of an automatic, rotating agricultural system which includes solar panel unit to supply electric power for the agricultural system.

With reference to FIG. 2, shown is a perspective view of an exemplary embodiment of automatic, rotating agricultural system 200 which includes solar panel unit 202 to supply electric power for the agricultural system 200. The structure of the rotating agricultural system 200 is substantially the same as the structure of the rotating agricultural system 100 except the solar panel unit 202. The solar panel unit 202 includes a plurality of solar panels 212 to produce electrical energy and to supply the electrical energy to the agricultural system 200. The agricultural system 200 includes one or more rechargeable batteries 229 which stores electrical energy produced by the solar panels 212 and supplies the electrical energy to components of the rotating agricultural system 200 to power components such as motors for driving wheels and conveyors.

In an embodiment, the solar panels 212 may be mounted on the section frames 102 of frame segments 130, 130'. However, the solar panels 212 may be placed in any locations in the agricultural system 200. The solar panels 212 may cover the cutter trolley beam 105. However, preferably, the solar panels 212 may not be placed at positions which may shade or cover the cut forage or crop on the radial conveyor 106 so that the cut forage or crop on the radial conveyor 106 may be exposed to sunlight. The agricultural system 200 includes a control unit 228 which has the similar functions as the control unit 128 of the agricultural system 100 described referring to FIGS. 1A-1E. The control unit 228 may further includes programing codes to monitor and control the solar panel unit 202. For example, the control unit 228 may detect output current and voltage from the solar panels 212 to monitor whether the solar panels 212 operates properly. If the current or voltage from the solar panels 212 is out of a predetermined range, the control unit 228 may transmit warning signals to operators in remote places through the communication interface 154.

Figure 3:
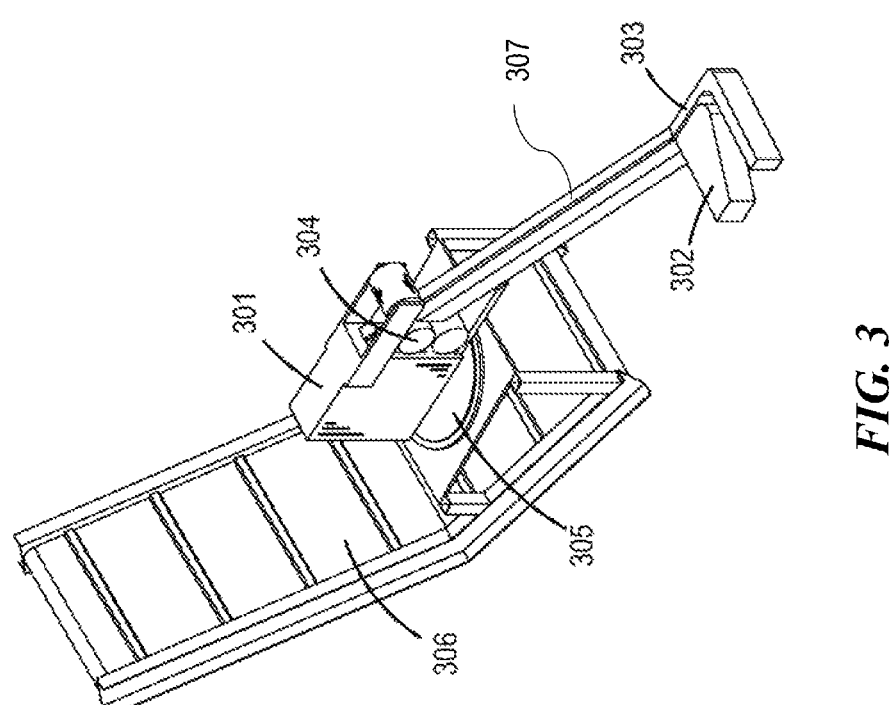
FIG. 3 is an exemplary embodiment of a swinging cutter and chopper that may be used for the cutterhead of the automatic, rotating agricultural system.

With reference to FIG. 3, shown is an exemplary embodiment of swinging cutter and chopper 300 that may be used for the cutterhead 110 of the rotating agricultural systems 100, 200. The swinging cutter and chopper 300 includes gathering head 302, cutting knife 303, conveyor 307, feed roll 304, and chopper 305. The gathering head 302 gathers forage or crop, the cutting knife 303 cuts the gathered forage or crop, and the conveyor 307 transfers the cut forage or crop upward. The feed roll 304 feeds the cut forage or crop into the body 301 and the chopper 305 that chops the cut forage or crop. The swinging cutter and chopper 300 swings back and forth (in the radial direction), while the agricultural system 100 or 200 is operated. The chopped crop or forage is transferred to the cutter conveyor 306 to be further transferred to the radial conveyor 106 of a frame segment as shown in FIGS. 1A and 2.

With reference to FIG. 4, shown is a flowchart diagram of a method 400 for operating an automatic, rotating agricultural system 100, 200 to irrigate, plant and/or harvest a field. Frame segments 130, 130' connected to each other are driven together to pivot or rotate the frame segments about a center pivot frame 123 fixed on ground, block 401. Forage or crop is cut by using at least one cutterhead 110 of the frame segments 130, 130', block 402. The cut forage or crop is transported via a cutter conveyor 130 to radial conveyors 106 of the frame segments from the at least one cutterhead 110, block 403. The cut forage or crop is transported via the radial conveyors 106 to a feed storage bin 124, block 404. The cut forage or crop is stored in the storage bin 124, block 405. The cutterhead 110 is moved by a predetermined distance in the radial direction of the frame segments 130, 130' to adjust a position of the cutterhead 110 for a next revolution, block 406.

Figure 5:
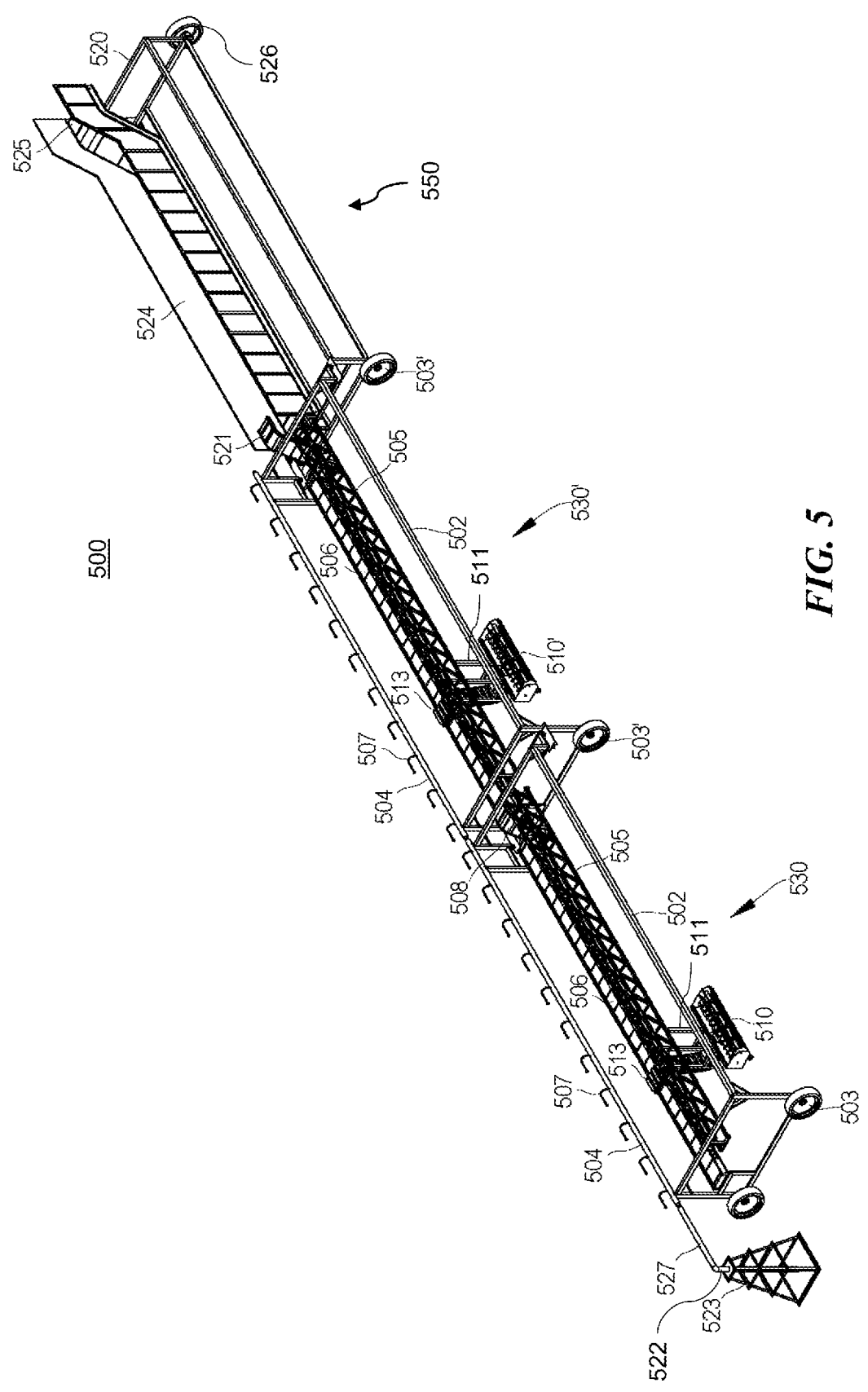
FIG. 5 is a perspective view of an embodiment of automatic, rotating agricultural system that is constructed to rotate around a central pivot point in either a full rotation or a partial arc to irrigate, plant, gather forage, and/or harvest a field.
Figure 6:
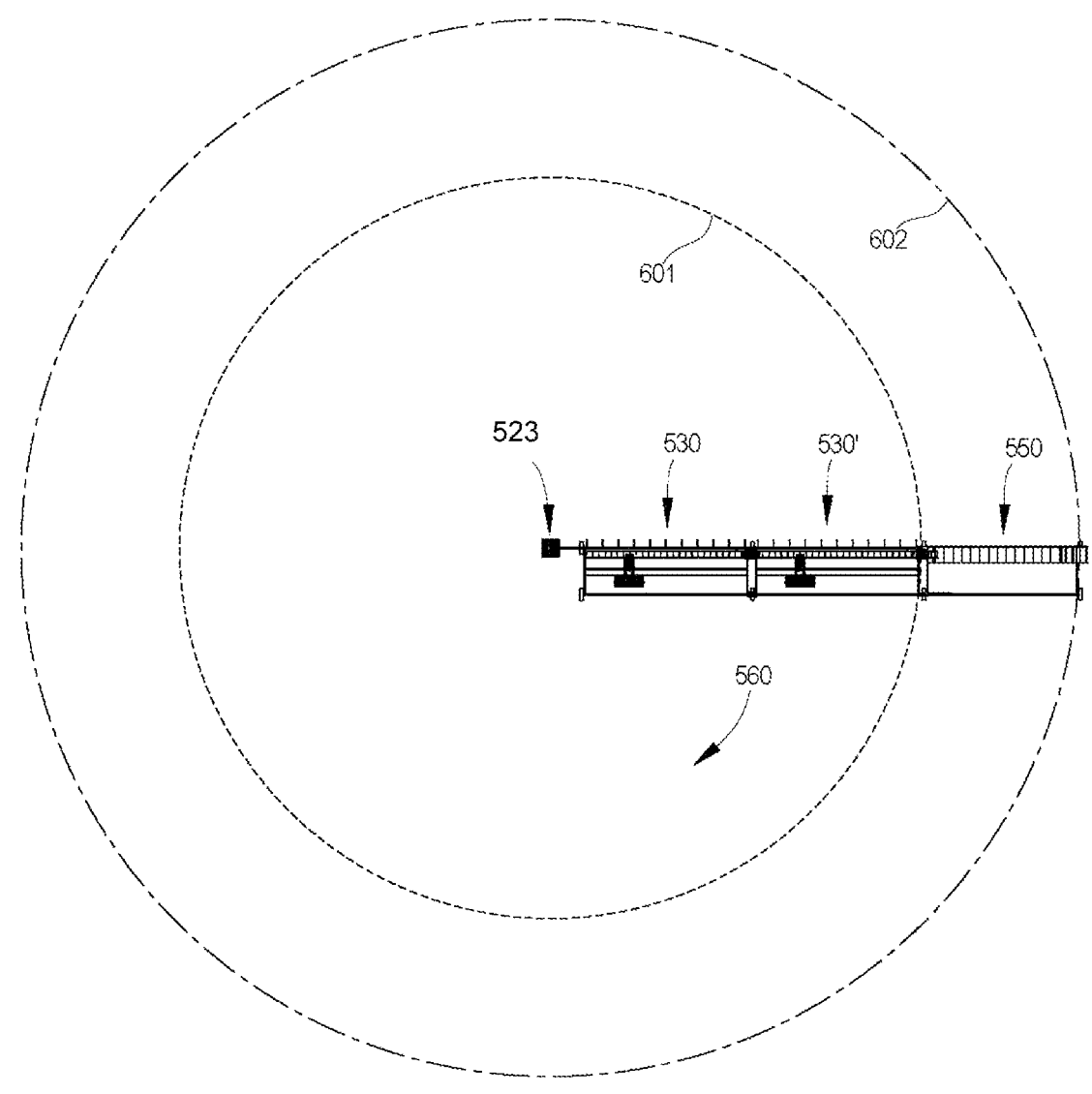
FIG. 6 is a diagram for an exemplary operation of the agricultural system in a full rotation to irrigate, plant, gather forage, and/or harvest a field.

With reference to FIG. 5, shown is a perspective view of an embodiment of automatic, rotating agricultural system 500 that is constructed to rotate around a central pivot point (for example, center pivot frame 523) in either a full rotation or a partial arc to irrigate, plant, gather forage, and/or harvest a field in a more efficient and productive way. With reference to FIG. 6, shown is a diagram for an exemplary operation of the agricultural system 500 in a full rotation to irrigate, plant, gather forage, and/or harvest a field.

The agricultural system 500 includes one or more frame segments 530, 530' and at least one feed storage bin section 550. Each of the frame segments 530, 530' includes wheeled section frame 502 to support a radial framework such as cutter trolley beam 505 which serves to support a series of harvesting units or attachments that may include one or more cutterheads 510, 510'. The feed storage bin section 550 includes feed storage bin 524 connected to the frame segments 530, 530'. The cutterheads 510, 510' discharge forage or harvested crop onto a radial conveyor 506 that transports the forage or harvested crop to the feed storage bin 524 where the forage or harvested crop can be stored, processed or transported for use or further processing.

The agricultural system 500 may be used for planting and harvesting or used in a harvest-only mode such as when harvesting a grain crop. A wide variety of attachments may be used for planting and harvesting different crop using the same basic structure to transport the attachment around the field without an operator being present at all times. For some applications, the agricultural system 500 may require considerable tractive power such as planting, and a supplemental drive wheels maybe attached to the planting attachment. It is in the case of partially harvesting forage crops for maximum quantity and quality of forage that it is desirable that the harvesting attachment be entirely supported by the overhead frame such as the cutter trolley beam 505. This leaves the surviving plant undamaged and able to continue growing without the long recovery time of traditional forage harvesting.

The agricultural system 500 includes powered wheeled towers or section frames 502 supporting an overhead frame or cutter trolley beam 505 that is above typical crop heights, conveyors 506 that extend along the radial length of the frame segments 530, 530', and movable attachments (for example, cutterheads 510, 510') that can be moved radially along the cutter trolley beam 505. For example, the attachment may be moved radially each rotation to a different arc diameter to cover the entire field for either planting or harvesting over a period of multiple rotations.

The agricultural system 500 is constructed to pivot about center pivot frame 523 in a circular pattern as shown in FIG. 6. The one or more frame segments 530, 530' are connected to each other. The frame segments 530, 530' include support wheels 503, 503' that are configured to provide smooth movements of the frame segments 530, 530'. The support wheels 503, 503' may be swivel wheels or Omni wheels to provide smooth movements of the frame segments 530, 530'. The wheels 503, 503' may be arranged tangential to a direction to the center pivot frame 523. One or more wheels among the wheels 503, 503' may be driving wheels (for example, wheels 503') to drive the frame segments 530, 530'.

The agricultural system 500 includes feed storage bin 524 to store, process, and/or transport the forage or harvested crop transported from the frame segments 530, 530' for further processing. The feed storage bin 524 is mounted on and supported by storage bin frame 520. The storage bin frame 520 may be connected to the section frames 502 of the nearest frame segment 530'. The feed storage bin 524 includes storage bin wheels 526 installed at the storage bin frame 520. When the frame segments 530, 530' pivot or rotate about the center pivot frame 523, the feed storage bin 524 moves together with the frame segments 530, 530', pivoting or rotating about the center pivot frame 523. The storage bin wheels 526 may be swivel wheels or Omni wheels to provide smooth movements of the feed storage bin 524. Optionally, one or more of the storage bin wheels 526 may be driving wheels.

As shown in FIG. 6, while the agricultural system 500 is operating, the frame segments 530, 530' and the feed storage bin 524 together pivot about center pivot frame 523 in a circular pattern. The frame segments 530, 530' move within the circle 601 while planting or harvesting the field area, and the feed storage bin 524 moves, while carrying the gathered forage or harvested crop, in the area outside the circle 601 and inside the outer circle 602.

FIG. 5 shows the driving wheel 503' at the outmost side of the frame segment 530, 530', but the location of the driving wheel 503' is not limited to this location. The driving wheel 503' can be placed at any locations to efficiently drive the frame segments 530, 530'. Each or some frame segments 530, 530' may have driving wheels. Driving mechanisms such as motors (for example, see motors 103a, 106a in FIG. 1C) may be employed for the driving wheels.

FIG. 5 shows two frame segments 530, 530' for illustration purpose, but the number of the frame segments is not limited. Any number of frame segments may be connected each other based on applications and size of the field. In the embodiment, the length of each frame segment may be around 60 feet (18 meters), but the frame segment is not limited to this length. Frame segments may have different lengths. In the embodiment, wheels 503, 503' are spaced apart to leave the vast majority of the field untouched for optimal growing conditions while the agricultural system 500 is driven. For example, as shown in FIG. 5, wheels 503, 503' are placed at end sides of a frame segment 530 or 530'. However, wheels 503, 503' may be placed at any locations in the frame segments 530, 530'.

The agricultural system 500 may include a piped irrigation system that includes one or more irrigation supply pipes 504 and irrigation sprinklers or nozzles 507 to dispense water either while harvesting is underway or separately. The irrigation supply pipes 504 is connected to irrigation supply connection pipe 527 that is coupled to the center pivot frame 523 to supply water. The irrigation supply pipes 504 run through the frame segments 530, 530'. Irrigation sprinklers or nozzles 507 are connected to the irrigation supply pipes 504 to allow irrigation either while harvesting or separately. In an embodiment, the sprinklers or nozzles 507 may be placed facing rear side (opposite side of the cutterheads 510, 510'). While the agricultural system 500 may be used in a variety of situations and crops, the agricultural system 500 is ideal for waste water disposal where forage crops are grown to absorb the organic nutrients.

The center pivot frame 523 may be fixed on the ground, and the agricultural system 500 may pivot about the center pivot frame 523. Center pivot supply pipe 522, which is rotatably connected to the irrigation supply connection pipe 527, may be coupled to the center pivot frame 523 and may extend into a water source that may be under the ground or in a remote place. Water may be supplied to the irrigation sprinkler or nozzles 507 through the center pivot supply pipe 522, the irrigation supply connection pipe 527 and the irrigation supply pipes 504. The irrigation supply pipe 504 runs the length of the agricultural system 500 to supply the irrigation sprinkler or spray nozzles 507 with water. The sprinklers or nozzles 507 may be formed on the irrigation sprinkler pipe 504. FIG. 5 exemplarily shows the sprinklers or nozzles 507 formed on each frame segments 530, 530'. However, the sprinklers or nozzles 507 may be formed on some the frame segments 530, 530'.

In the embodiment shown in FIG. 5, the frame segment 530, which is located closest to the center pivot frame 523, is connected to the center pivot frame 523 by the irrigation supply connection pipe 527. The other frame segment 530' is connected to the frame segment 530, and the feed storage bin 524 is connected to the frame segment 530'. However, the connection to the center pivot frame 523 is not limited to this configuration shown in FIG. 5. For example, as shown in FIG. 1A, the frame segments 130, 130' may be connected to the center pivot frame 123 by the feed storage bin 124. FIG. 5 exemplarily shows that the frame segment 530 is connected to the center pivot frame by the irrigation supply connection pipe 527. However, various alternative mechanisms may be added to connect the frame segment 530 to the center pivot frame 523. For example, additional mechanisms, such as a connection frame (not shown), may be employed to connect the frame segment 530 to the center pivot frame 523. The additional mechanism may be configured to provide rotational movements of the frame segments 530, 530' about the center pivot frame 523.

In the embodiment shown in FIG. 5, the feed storage bin 524 is connected to the frame segment 530' that is positioned farthest from the center pivot frame 523. In other words, the feed storage bin 524 is located at an outer edge of the series of the frame segments 530, 530', moving in the area outside the circle 601. In this configuration, the forage or harvested crop may be transported or dumped at a certain location of a field, such as a corner of the field, which may be position around the outer circle 602. The forage or harvested crop, transported from the frame segments 530, 530', may be kept in the feed storage bin 524 until the feed storage bin 524 reaches the location that is designated for dump or further external transportation. The location of the feed storage bin 524, however, is not limited to the location shown in FIG. 5. For example, as shown in FIG. 1A, the feed storage bin 524 may be placed near the center pivot frame 523. Alternatively, the feed storage bin 524 may be placed between two frame segments 530, 530' based on applications and configuration of the field. In other words, the frame segments 530, 530' and the feed storage bin 524 may be arranged in many different ways that are optimized for certain applications and configuration of the field.

The cut or gathered forage or crop is carried by the radial conveyors 506 of the frame segments 530, 530', and may be transferred into feed storage bin 524. The agricultural system 500 may include segment transfer conveyors 508 between radial conveyors 506 of the frame segments 530, 530'. Therefore, forages or crop can be smoothly transferred from radial conveyor 506 of one frame segment to radial conveyor 506 of next frame segment. The agricultural system 500 may further include storage bin transfer conveyor 521 that is placed between the radial conveyor 506 of the frame segment 530' and the feed storage bin 524 so that the cut or gathered forage or crop may be smoothly transferred to the feed storage bin 524 from the frame segment 530'.

While the agricultural system 500 is operating, the cut forage or crop is transferred to the feed storage bin 524 from the frame segments 530, 530' and is stored in the feed storage bin 524. The feed storage bin 524 may have typical shapes of containers or hoppers configured to store agricultural products. As shown in FIG. 5, the feed storage bin 524 may have side walls and a floor to securely keep the stored agricultural products. In the embodiment of the agricultural system 500, the feed storage bin 524 may have a floor conveyor 525 placed on the floor of the feed storage bin 524 to equally distribute the cut forage or crop inside the feed storage bin 524 and also to transport the stored forage or crop externally. For example, when the feed storage bin 524 reaches a location designated for unloading the stored forage or crop, the stored forage or crop in the feed storage bin may be transported externally by using the floor conveyor 525 for use or further processing. In this case, a container or feed truck (not shown) may be placed at an end of the feed storage bin 524, and the stored forage and harvested crop may be unloaded to the container or feed truck by the floor conveyor 525 for further processing.

The agricultural system 500 includes one or more attachments to harvest crop or to cut or chop forage. The attachment may be cutterheads 510, 510' or other equipment that may include a gathering head that gathers forage or crop, a cutting knife that cuts the gathered forage or crop, and/or a chopper that chops the cut forage or crop. For description purpose, FIG. 5 exemplarily shows cutterheads 510, 510' for the attachment. The cutterhead 510 is connected to and supported by a cutter trolley beam (overhead frame) 505 that extends along the length of each frame segment 530, 530'. The cutter trolley beam 505 allows the cutterhead 510 to translate incrementally to a new arc and cut the forage at a desired height that maintains optimal growing conditions without crushing any of the crop. The cut forage (aka feed) or crop may be transported by cutter conveyor 513 upward to the radial conveyor 506 which transports the cut forage or crop to the feed storage bin 524. The agricultural system 500 may further includes cutter trolleys 511 that are movably coupled to the cutter trolley beam 505 and is coupled to and supports the cutterhead 510 and the cutter conveyor 513 so that the cutter trolley 511 moves the cutterhead 510 and cutter conveyor 513 along the cutter head trolley beam 505 in the radial direction of the frame segment 530. Functionalities and structures of these elements are described above referring to FIG. 1D.

The agricultural system 500 includes motors, such as motors 103a, 106a shown in FIG. 1C, placed at proper locations to drive elements of the agricultural system 500. The motors drive the driving wheels 503' of the agricultural system 500 to pivot or rotate the agricultural system 500 around the center pivot frame 523, operate and move the radially movable forage or crop cutterhead 510 or any attachment, and operate the various conveyors, such as conveyors 506, 508, 513, and 525, to transport the cut forage or crop to the storage bin 524. The motors may be coupled with any driving mechanisms, and may be placed near the components of the agricultural system which require driving power. The agricultural system 500 includes at least one power source 129 (see FIG. 1A) to supply power to the motors and components that require power. The power source 129 may be rechargeable batteries, fueled generators and/or power supply that may be connected to power grids. The power source 129 may be placed in the feed storage bin 524, as shown in FIG. 1A. Alternatively, the power source may be placed at any one of the frame segments 530, 530'. Optionally, the agricultural system 500 may include multiple power sources placed at some of the frame segments 530, 530'. Alternatively, the agricultural system 500 may include solar panel unit, such as the solar panel unit 202 shown in FIG. 2, to supply electric power for the agricultural system 500. The agricultural system 500 may also include at least one computerized, programmable control unit 128 (see FIG. 1A) that manages power distribution and controls components such as motors to automatically and programmably operate the agricultural system as described herein. The control unit 128 may be placed in the feed storage bin 524, as shown in FIG. 1A. Alternatively, the control unit may be placed at any one of the frame segments 530, 530'. Elements of the control unit are described above referring to FIG. 1F.

Figure 7:
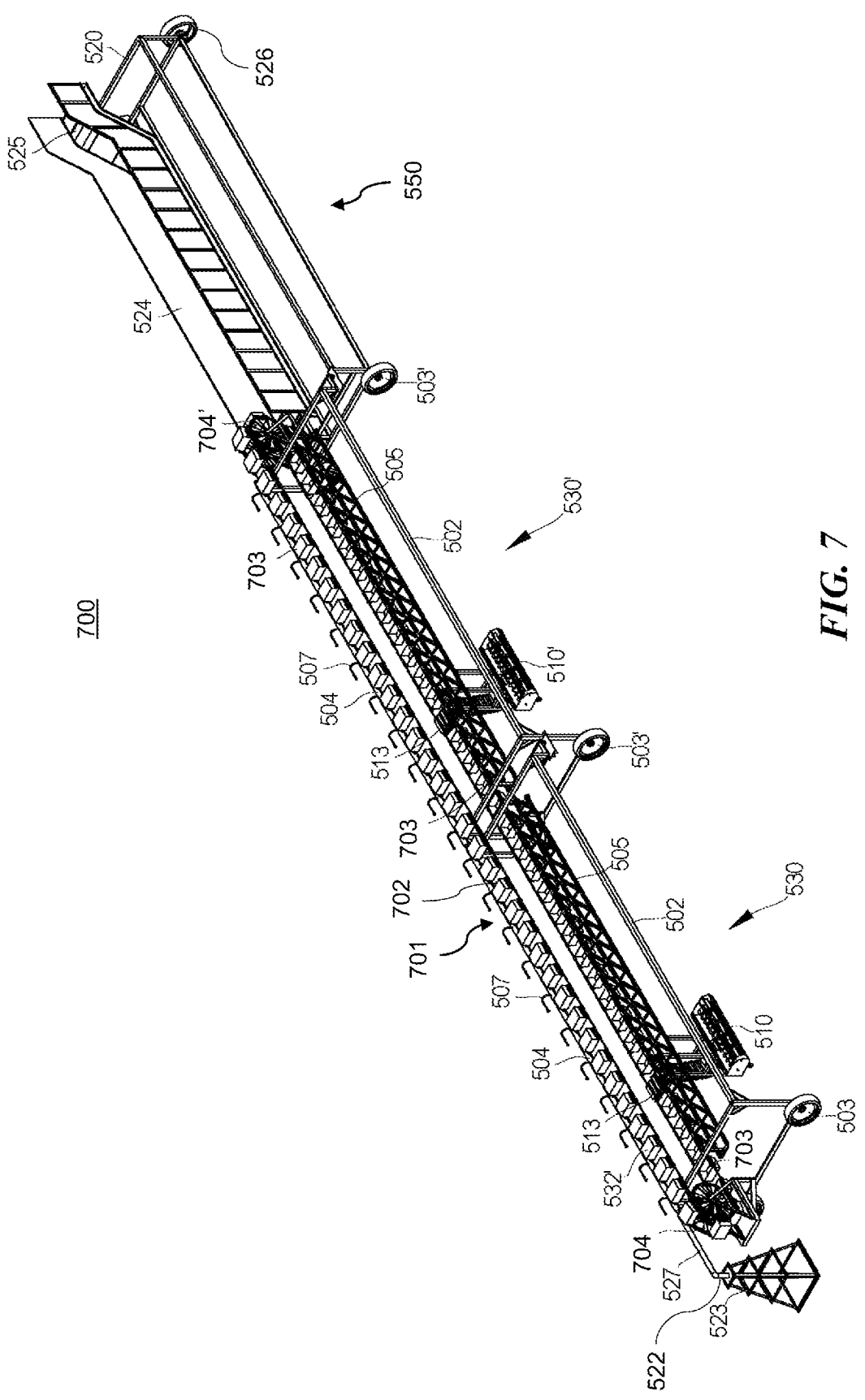
FIG. 7 is a perspective view of another embodiment of automatic, rotating agricultural system that is constructed to be equipped with conveyor system.

With reference to FIG. 7, shown is a perspective view of an embodiment of automatic, rotating agricultural system 700 that is constructed to be equipped with conveyor system 701. The structure of the agricultural system 700 is substantially the same as the structure of the agricultural system 500 except that the radial conveyor 506 is replaced with the conveyor system 701. The conveyor system 701 includes carriage conveyor 702, conveyor wheels 704, 704' that are coupled to the carriage conveyor 702 and drive the carriage conveyor 702, and carriages 703 mounted on the carriage conveyor 702. The carriages 703 may be any types of buckets, containers, trolley cars, and tanks. For example, the carriages 703 may be configured to transport forage or harvested crop and/or to transport liquid slurry to fertilize and irrigate plants. The conveyor wheels 704, 704' may be placed at ends of the series of the frame segments 530, 530', and the carriage conveyor 702 forms a loop between the conveyor wheels 704, 704'. Driven by the conveyor wheels 704, 704', the carriage conveyor 702 may run through the entire radial length of the frame segments 530, 530'.

The carriages 703 may include containers that is configured to transport forage or crop. In this embodiment, the carriages 703 transport the forage or crop, which is gathered by the cutterheads 510, 510', to the feed storage bin 524. Alternatively, in another embodiment, the carriages 703 may includes another type of containers that is configured to transport liquid slurry. In the embodiment, the carriages 703 may haul slurry from tank (not shown) located at an outer edge of the frame segments 530, 530' to fertilize and irrigate plants through injectors. The intervals between carriages 703 or the number of carriages 703 may vary depending on applications. The carriages 703 may be densely placed or sparsely placed based on applications.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. An agricultural system configured to irrigate, plant, gather forage, and/or harvest a field, comprising:
   a center pivot frame fixed on ground;
   one or more frame segments connected to each other, wherein the frame segments are rotatably connected to the center pivot frame and are configured to pivot or rotate about the center pivot frame, and each frame segment comprises:
   a section frame comprising wheels to enable a movement of the frame segment about the center pivot frame;
   a cutter trolley beam that is coupled to the section frame and extends in a radial direction of the section frame;
   at least one cutterhead coupled to the cutter trolley beam to cut forage or crop, wherein the cutterhead is movable along the cutter trolley beam in the radial direction of the section frame; and
   a radial conveyor supported by the section frame, wherein the radial conveyor is configured to move the cut forage or crop in the radial direction of the section frame; and
   a feed storage bin connected to the frame segments and comprising wheels to enable a movement of the feed storage bin about the center pivot frame together with the frame segments, wherein the feed storage bin is configured to receive the cut forage or crop transported by the radial conveyors.

2. The agricultural system of claim 1 wherein the feed storage bin comprises:
   a floor to store the forage or crop; and
   a floor conveyor placed on the floor to move the forage or crop stored inside the feed storage bin.

3. The agricultural system of claim 1 wherein the feed storage bin is directly connected to the frame segment located farthest from the center pivot frame.

4. The agricultural system of claim 1 wherein said each frame segment further comprises:
   a cutter conveyor coupled to the cutterhead, wherein the cutter conveyor is configured to move the forage or crop from the cutterhead to the radial conveyor; and
   at least one cutter trolley movably coupled to the cutter trolley beam and supporting the cutterhead and the cutter conveyor, wherein the cutter trolley is configured to move the cutterhead and the cutter conveyor in the radial direction of the section frame along the cutter trolley beam.

5. The agricultural system of claim 1 further comprising:
   a segment transfer conveyor coupled between the radial conveyors of the frame segments to transfer the forage or crop between the frame segments; and
   a storage bin transfer conveyor coupled between the feed storage bin and the radial conveyor of the nearest frame segment to transfer the forage or crop to the feed storage bin from the radial conveyor of the nearest frame segment.

6. The agricultural system of claim 1 wherein the frame segments comprise irrigation supply pipes to supply water to sprinklers or nozzles connected to the irrigation supply pipes.

7. The agricultural system of claim 6 wherein the center pivot frame comprises a center pivot supply pipe connected to the irrigation supply pipes to supply water to the irrigation supply pipes of the frame segments.

8. The agricultural system of claim 1 wherein at least one of the frame segments comprises one or more driving wheels to drive the frame segments connected to each other to pivot or rotate about the center pivot frame.

9. The agricultural system of claim 8 further comprising at least one power source to supply power to motors of the driving wheels and the radial conveyors.

10. The agricultural system of claim 1 further comprising a control unit to control operations comprising:

starting driving of the frame segments connected to each other to pivot or rotate about the center pivot frame;

stopping the driving of the frame segments connected to each other; and adjusting a position of the at least one cutterhead along the cutter trolley beam.

11. An agricultural system configured to irrigate, plant, gather forage, and/or harvest a field, comprising:

a center pivot frame fixed on ground;

one or more frame segments connected to each other, wherein the frame segments are rotatably connected to the center pivot frame and are configured to pivot or rotate about the center pivot frame, and each frame segment comprises:

a section frame comprising wheels to enable a movement of the frame segments about the center pivot frame;

a cutter trolley beam that is coupled to the section frame and extends in a radial direction of the section frame; and at least one attachment coupled to the cutter trolley beam to gather forage or crop, wherein the at least one attachment is movable along the cutter trolley beam in the radial direction of the section frame;

a conveyor system comprising carriages configured to move materials; and a feed storage bin connected to the frame segments and comprising wheels to enable a movement of the feed storage bin about the center pivot frame together with the frame segments, wherein the feed storage bin is configured to receive the cut forage or crop transported by the conveyor system.

12. The agricultural system of claim 11 wherein the feed storage bin comprises:

side walls and a floor to store the forage or crop; and a floor conveyor placed on the floor to move the forage or crop stored inside the feed storage bin.

13. The agricultural system of claim 11 wherein the feed storage bin is directly connected to the frame segment located farthest from the center pivot frame.

14. The agricultural system of claim 11 wherein the conveyor system comprises:

a carriage conveyor on which the carriages are mounted; and conveyor wheels placed at ends of a series of the frame segments, wherein the conveyor wheels are couple to the carriage conveyor to drive the carriage conveyor to move the carriages along the radial direction of the frame segments.

15. The agricultural system of claim 11 wherein the carriages comprise one or more containers configured to carry liquid slurry.

16. The agricultural system of claim 11 wherein the carriages comprise one or more containers configured to carry the forage or crop.

17. The agricultural system of claim 11 wherein the frame segments comprise irrigation supply pipes to supply water to sprinklers or nozzles connected to the irrigation supply pipes.

18. The agricultural system of claim 17 wherein the center pivot frame comprises a center pivot supply pipe connected to the irrigation supply pipes to supply water to the irrigation supply pipes of the frame segments.

19. The agricultural system of claim 11 wherein at least one of the frame segments comprises one or more driving wheels to drive the frame segments connected to each other to pivot or rotate about the center pivot frame.

20. The agricultural system of claim 19 further comprising at least one power source to supply power to motors of the driving wheels and the conveyor system.

21. The agricultural system of claim 11 further comprising a control unit to control operations comprising:

starting driving of the frame segments connected to each other to pivot or rotate about the center pivot frame;

stopping the driving of the frame segments connected to each other; and adjusting a position of the at least one attachment along the cutter trolley beam.

22. The agricultural system of claim 11 wherein the at least one attachment comprises an attachment selected from the group consisting of:

a gathering head that gathers forage or crop;

a cutting knife that cuts the gathered forage or crop; and a chopper that chops the cut forage or crop, wherein the chopped forage or crop is transferred to the conveyor system.

23. An agricultural system configured to irrigate, plant, gather forage, and/or harvest a field, comprising:

one or more frame segments connected to each other; each frame section including, a section frame comprising wheels to enable movement of the frame segment;

a cutter trolley beam that is coupled to the section frame;

a cutterhead coupled to the cutter trolley beam to cut forage or crop, wherein the cutterhead is movable laterally along the cutter trolley beam across a width of the section frame;

a first conveyor supported by the section frame, wherein the first conveyor is configured to move the cut forage or crop along a length of the section frame; and a cutter conveyor coupled to and movable together with the cutterhead, the cutter conveyor extending between and configured to move the cut forage or crop between the cutterhead and the first conveyor.

24. The agricultural system of claim 23, wherein the section frame includes a distal end, and wherein the first conveyor is configured to move the cut forage or crop toward the distal end of the section frame.

25. The agricultural system of claim 24, further comprising a feed storage bin adjacent the distal end of the section frame, the feed storage bin configured to receive the cut forage or crop transported from first conveyor.

26. The agricultural system of claim 25, wherein the feed storage bin includes wheels for moving the cut forage or crop with the frame segments.

27. The agricultural system of claim 23, wherein the first conveyor moves the crop in a direction parallel to the direction of movement of the cutterhead.

* * * * *